United States Patent [19]

Meissner et al.

[11] 3,903,242

[45] Sept. 2, 1975

[54] COBALT-MANGANESE TITANATE NOBLE METAL COMBINATION CATALYSTS

[75] Inventors: Helmuth E. Meissner, Painted Post; Hermann L. Rittler, Horseheads, both of N.Y.

[73] Assignee: Corning Glass Works, Corning, N.Y.

[22] Filed: Apr. 8, 1974

[21] Appl. No.: 458,775

[52] U.S. Cl. .......... 423/213.2; 423/213.5; 252/461; 252/466 B; 252/469; 252/471; 252/472
[51] Int. Cl. ..................... B01j 21/06; F01n 3/15
[58] Field of Search.............. 423/213.2, 213.5, 245, 423/247; 252/461, 466 B, 469, 471, 472; 23/288 F

[56] References Cited
UNITED STATES PATENTS

| | | | |
|---|---|---|---|
| 3,202,618 | 8/1965 | Jaffe | 252/469 |
| 3,216,954 | 7/1966 | Hauk et al. | 423/213.2 X |
| 3,230,034 | 1/1966 | Stiles | 423/213.5 |
| 3,505,118 | 4/1970 | Mehra et al. | 252/461 X |

*Primary Examiner*—G. O. Peters
*Attorney, Agent, or Firm*—Kees van der Sterre; Clinton S. Janes, Jr.; Clarence R. Patty, Jr.

[57] ABSTRACT

Noble metal-containing cobalt-manganese titanate catalysts active for carbon monoxide and hydrocarbon oxidation and the use of these catalysts in catalytic devices for the treatment of combustion exhaust gases such as automotive exhaust gases are described.

12 Claims, No Drawings

COBALT-MANGANESE TITANATE NOBLE METAL COMBINATION CATALYSTS

BACKGROUND OF THE INVENTION

The present invention has general application in the field of oxidation catalysis and particular application in the field of oxidation catalysts for automotive exhaust emissions control devices.

The use of certain base metal titanates for the oxidation of carbon monoxide and unburned hydrocarbons present in the exhaust stream of an automobile or other device or installation utilizing a hydrocarbon combustion process is described in the copending application of G. H. Beall et al., entitled "Base Metal Titanate Catalysts," Ser. No. 448,834, filed Mar. 7, 1974. Such catalysts, which are composed of titanium oxide in combination with the oxides of manganese, cobalt, iron, copper, aluminum and chromium, consist of titaniferous solid solutions of spinel, ilmenite and/or pseudobrookite structure which are found to be active phases for the oxidation of carbon monoxide, propylene, hexane, and other hydrocarbons commonly found in hydrocarbon combustion exhaust gases. The active titaniferous solid solutions of spinel structure are of the formula $M_2TiO_4$—$M_3O_4$, M being one or more metals selected from the group consisting of Mn, Co, Fe, Cu, Al, and Cr, whereas the titaniferous solid solutions of ilmenite structure are of the formula $MTiO_3$—$M_2O_3$, M being selected from the same group of metals as for the spinels.

Iron-containing titaniferous solid solutions of ilmenite ($FeTiO_3$—$Fe_2O_3$), spinel ($Fe_2TiO_4$—$Fe_3O_4$) and pseudobrookite ($FeTi_2O_5$—$Fe_3TiO_5$) structure are found in nature, and have been described by Buddington and Lindsley in "Iron-Titanium Oxide Minerals and Synthetic Equivalents," *Journal of Petrology*, Volume 5, Part 2, pages 310–357 (1964). The base metal titanates of Beall et al. are of analogous structure and the aforementioned application of Beall et al. is expressly incorporated herein by reference for a detailed explanation of the preparation, structure, and behavior of these catalysts.

The use of noble metals in combination with active base metals to provide a useful catalytic material has long been proposed. U.S. Pat. No. 794,512 to Knietsch provides an early example of the use of platinum in combination with iron oxide, chromium oxide, copper oxide, or mixtures thereof as a catalyst for the manufacture of sulfuric acid, and U.S. Pat. No. 3,619,127 to Hass illustrates the use of platinum in combination with chromium oxide as a catalyst for the treatment of automotive exhaust gases to oxidize carbon monoxide and unburned hydrocarbons present therein.

One of the objects of combining noble metals such as platinum with base metal catalysts is to provide a combination catalyst of high activity wherein the noble metals are only minor constituents. Although they are intrinsically more active for carbon monoxide and hydrocarbon oxidation than most base metal catalysts, the noble metals are expensive and the amount required in a particular noble metal-base metal catalyst system is an important factor in determining the total cost of that system. Unfortunately, combining a base metal catalyst with a highly-active noble metal catalyst such as platinum does not necessarily permit reductions in the platinum content of the system. To the contrary, in many cases, particularly where the catalyst is required to operate at elevated temperatures, the introduction of base metal components into the catalyst system results in noble metal-base metal interactions which actually decrease the activity of the noble metal system components and the overall activity of the system. Hence, increased quantities of noble metals are required and no cost savings are realized in the combined system.

What is therefore desired is a noble metal-base metal catalyst system wherein the base metal catalyst component is compatible with the noble metals present such that, even at elevated temperatures, interactions between the base metal and noble metal components which operate to reduce the overall activity of the system are suppressed.

Also, a base metal-noble metal catalyst system exhibiting a degree of thermal stability which would permit the use of reduced quantities of noble metals without sacrificing the high degree of oxidation activity provided by noble metal components would be highly desirable.

SUMMARY OF THE INVENTION

We have now discovered that certain base metal titanate catalysts demonstrate a level of thermal stability and compatibility with active noble metals such that they may be beneficially employed in direct combination with such noble metals to provide combination noble metal-base metal catalysts which are very active for the oxidation of carbon monoxide and hydrocarbons and more stable against thermal degradation than prior art base metal-noble metal combinations.

The base metal titanate component of the catalysts of the invention is a cobalt-manganese titanate which consists essentially of cobalt, manganese, and titanium oxides, these oxides not being present in uncombined form but rather in the form of cobalt and manganese titanates. More specifically, the cobalt-manganese titanate component of the catalysts of the invention is a predominantly crystalline material comprising a major crystal phase consisting of at least one crystalline species selected from the group consisting of titaniferous solid solutions of spinel ($M_2TiO_4$—$M_3O_4$) structure and titaniferous solid solutions of ilmenite ($MTiO_3$—$M_2O_3$) structure, wherein M is cobalt, manganese, or mixtures thereof. Since these crystalline species constitute the major crystal phase (at least 50% by volume) of the cobalt-manganese titanate catalyst component, uncombined oxides such as rutile ($TiO_2$), CoO or MnO will comprise at most only minor constituents of the catalyst. The cobalt-manganese titanate component may in a few instances consist entirely of the active solid solution end members $Co_2TiO_4$, $Mn_2TiO_4$, $CoTiO_3$, and $MnTiO_3$; however, as a rule $Co^{+3}$ and $Mn^{+3}$ will be present as $Mn_2O_3$, $Co_3O_4$, $CoMn_2O_4$, or other compounds of spinel or ilmenite structure in solid solution with these end members.

The noble metal component of the catalysts of the invention may include metals of the so-called platinum group, including platinum, rhodium, ruthenium, palladium, iridium, and mixtures thereof. However, the major constituent of the noble metal component is preferably platinum. The noble metal component of the catalysts of the invention normally comprises about 0.00125–25% by weight of the catalyst, with the cobalt-manganese titanate component making up the remainder thereof.

For the purpose of oxidizing carbon monoxide and unburned hydrocarbons present in the exhaust stream from a hydrocarbon combustion process, our catalysts are desirably disposed on refractory inert supports such as alumina beads or monolithic structures of the honeycomb type. Such supports may be composed of any refractory compounds which are stable at the anticipated use temperature of the supported catalyst, including for example alumina, silica, magnesia, cordierite, mullite, spodumene, zirconia, or any other of a wide variety of refractory materials employed for this purpose in the art. It is preferred, however, that the support have a high surface area or else is provided with an inert catalyst support coating having a high surface area upon which the catalyst is deposited. A particularly desirable device for treating hydrocarbon combustion exhaust gases comprises a refractory support structure of the honeycomb type, a conventional high surface area support coating on the support structure, composed, for example, of silica, alumina, or mixtures thereof, and a cobalt-manganese titanate-platinum group metal combination catalyst on the support coating comprising about 2–40% by weight of the device.

The supported catalysts of the invention may be utilized in the conventional manner to treat hydrocarbon combustion exhaust gases. Treatment typically involves contacting flowing exhaust gases with the supported catalyst at exhaust gas temperatures in excess of about 450°F., at which temperatures substantial conversion of carbon monoxide and unburned hydrocarbons to carbon dioxide and water rapidly occurs.

DETAILED DESCRIPTION

The cobalt-manganese titanate component of the catalysts of the invention may be prepared by high-temperature firing of mixtures of oxides or other compounds of cobalt, manganese, and titanium which are converted to oxides at the firing temperatures employed, and which then interact in the solid state at these temperatures to form the desired titaniferous solid solutions. Operative mixtures, which consist preferably of oxides, carbonates or nitrates of cobalt, manganese, and titanium, have a composition, calculated on the oxide basis in weight percent, of about 30–50% $TiO_2$, 5–25% $MnO_x$, and 35–50% $CoO_x$, wherein $x$ ranges from about 1 to about 1.5. These mixtures may be fired at temperatures in the range of about 1,000°–1,600°C. for at least about an hour to obtain the desired titanate crystal phases. The sintered product, either in bulk or in pulverized form, may then be impregnated with platinum group metals by conventional means. For example, the base metal titanate may be impregnated with an aqueous solution of a platinum group metal acid or salt followed by drying or calcining to convert the platinum group metal salt or acid to the metallic state. Hence, in a broad sense the invention comprises a combination catalyst comprising a platinum group metal component and a base metal titanate component, the base metal titanate component having an oxide composition, calculated in weight percent from the batch, of about 30–50% $TiO_2$, 5–25% $MnO_x$, and 35–50% $CoO_x$, $x$ ranging from about 1 to 1.5, and the base metal titanate component being further characterized in that it comprises a major crystal phase consisting of at least one crystalline species selected from the group consisting of titaniferous solid solutions of spinel ($M_2TiO_4$–$M_3O_4$) and ilmenite ($MTiO_3$–$M_2O_3$) structure, M being cobalt, manganese, or mixtures thereof. The platinum group metal component, which may be platinum, rhodium, ruthenium, iridium, palladium, or mixtures thereof, may comprise between about 0.00125 and 25% by weight of the combination catalyst, and may be dispersed throughout the bulk of the cobalt manganese titanate mass or supported on the surface thereof.

One of the principal advantages of combination catalysts as above set forth is the marked stability and activity demonstrated thereby as the result of the compatibility between the noble metal and base metal components of the catalyst system. This compatibility is not demonstrated by other base metal-noble metal systems, or even by other noble metal-base metal titanate systems, at least insofar as we are aware. Hence, the copper-manganese titanates, for example, which are closely related to the cobalt-manganese titanates and which also demonstrate very high levels of activity and stability, are not sufficiently compatible with noble metals so as to be suitable for use in accordance with the present invention.

The stability of the cobalt-manganese titanate-noble metal combination catalysts of the invention is particularly desirable and in fact critical when low concentrations of noble metals are to be employed. Decreased noble metal loadings permit the cost advantages of noble metal-base metal combination catalysts to be realized, yet prior art combination systems have not demonstrated sufficient stability to permit the full realization of these advantages. We have found that cobalt-manganese titanate-noble metal catalysts wherein the noble metal component comprises not more than about 5% by weight of the catalyst offer significant advantages in performance, from the standpoint of both activity and stability, when compared with prior art base metal-noble metal systems wherein equivalent amounts of noble metals are employed. These advantages are most pronounced when platinum is the selected catalyst, but may also be realized with other commonly-employed noble metals including rhodium, ruthenium, palladium, and mixtures of these four metals.

In cases where noble metal concentrations below about 5% by weight of the combination catalyst are to be employed, it is desirable to provide the noble metal component in the form of a uniform metallic film or dispersion on the external surface of the cobalt-manganese titanate component in order to maximize noble metal-reactant contact. This is most efficiently accomplished through the use of the combination catalyst in the form of a coating on a refractory inert support, with the noble metal component of the catalyst being present as a metallic surface film or dispersion on the supported catalyst coating. Conventional supports such as alumina beads, pellets or other configurations are useful for this purpose; however, refractory support structures of the honeycomb type such as described, for example, in U.S. Pat. No. 3,112,184 to Hollenbach or U.S. Pat. No. 3,790,654 to Bagley are preferred. Catalyst loadings, when the catalysts are employed as coatings, may range from about 2–40% by weight based on the total weight of the catalyst plus the support, and preferably range from about 5–15% by weight.

While the cobalt-manganese titanate component of the combination catalyst may be prepared by any of the means hereinabove set forth and thereafter applied to a selected support by any of the means well known in the art, it is preferred in the production of supported coatings of the combination catalyst as above described to form a cobalt-manganese titanate coating in situ on the support prior to the introduction of the noble metal catalyst component. This may be accomplished by treating the support with a solution comprising compounds of titanium, cobalt, and manganese to provide a coating of the solution on the surface of the support, and then further treating the coated support to decompose the titanium, cobalt, and manganese compounds and to form the cobalt-manganese titanate component therefrom. This method is more completely described in the copending patent application of H. L. Rittler, Ser. No. 448,835, filed Mar. 7, 1974, expressly incorporated herein by reference for a further explanation thereof.

A preferred procedure for providing a cobalt-manganese titanate coating on a support comprises preparing an acetic acid-stabilized methanol solution of titanium tetraisopropoxide, cobalt nitrate, and manganese nitrate, these compounds of titanium, cobalt, and manganese being present in solution in proportions calculated to yield a titanate product having an oxide composition, in weight percent, of 30–50% $TiO_2$, 5–25% $MnO_x$, and 35–50% $CoO_x$, $x$ ranging between 1 and 1.5; providing a coating of this solution on the support by immersing the support in the solution, thereafter briefly immersing the coated support in aqueous ammonium hydroxide to cause the precipitation of the hydrous oxides of titanium, cobalt, and manganese from the solution onto the support, and finally heating the hydrous oxide-coated support to a temperature in the range of about 600°–1,200°C. for about 1–4 hours to form the cobalt-manganese titanate catalyst component from the hydrous oxides by solid state interaction.

Other oxides such as $Fe_2O_3$, $Cr_2O_3$, and $CuO$ which are known to be capable of entering into catalytically-active titaniferous solid solutions of spinel and ilmenite structure are not included within the class of constituents which may be incorporated into the catalysts of the invention because of the possibility of deleterious interactions between these constituents and the noble metal component of our catalysts. However, alumina may comprise a minor constituent of the titanate phase, not exceeding about 20% of the catalyst by weight, without substantially affecting the desirable characteristics of these catalysts.

Preferred cobalt-manganese titanate components according to the invention, demonstrating the highest level of activity and stability when combined with noble metal components comprising only a minor proportion (less than 5% by weight) of the catalyst, have a composition on the oxide basis as calculated from the proportions of starting compounds, of about 45–50% $TiO_2$, 10–20% $MnO_x$, and 35–40% $CoO_x$, wherein $x$ ranges from 1–1.5. It will of course be recognized that these oxides are not present in uncombined form as such in the final catalyst; rather, the catalyst itself will predominantly comprise cobalt-manganese titanates of spinel and/or ilmenite structure, the spinel structures including, in solid solution, constituents selected from the group consisting of $Co_2TiO_4$, $Mn_2TiO_4$, $Co_3O_4$, $MnCo_2O_4$, and $Mn_3O_4$, and the ilmenite structures including, in solid solution, constituents selected from the group consisting of $CoTiO_3$, $MnTiO_3$, $Mn_2O_3$, and $Co_2O_3$.

The application of the noble metal component of the combination catalyst to the surface of the supported cobalt-manganese titanate component may be accomplished by any conventional means known in the art, but is preferably accomplished by a method which will provide a highly-uniform film or dispersion of noble metal on the catalyst surface. One suitable method of obtaining uniform noble metal distribution comprises immersing the titanate-coated support in an aqueous noble metal-containing solution, and thereafter promoting the deposition of the noble metal onto the titanate-coated support through the addition of reducing agents such as formic acid, formaldehyde, hydrogen, hydrazine or sodium formate thereto. The use of a formic acid reductant as described in the copending commonly assigned application of Armistead et al., Ser. No. 314,704, filed Dec. 13, 1972, now U.S. Pat. No. 3,842,017, issued Oct. 15, 1974, is a particularly suitable method. The deposition of the noble metal component on the surface of the cobalt-manganese titanate by such methods is particularly advantageous where low noble metal loading, e.g., 0.5–5% by weight of the combination catalyst, are employed.

Supported catalysts such as above described are best employed in combination with refractory support structures of the honeycomb type. In many instances, however, such structures do not exhibit high surface area and/or contain constituents which are harmful to catalytic activity. In such cases it is desirable that the honeycomb support include a high surface area support coating (e.g., a surface area of 20 $m^2$/gram or more), which may be composed, for example, of silica, alumina, or mixtures thereof. Catalytic devices produced according to the invention therefore desirably include a refractory support structure of the honeycomb type, a high surface area support coating on the support structure, and a coating of the cobalt-manganese titanate-noble metal combination catalyst on the support coating, the noble metal component of the catalyst being present in the form of a uniform metallic film or dispersion on the surface of the cobalt-manganese titanate component.

The catalysts of the present invention may be employed in the treatment of exhaust gases from hydrocarbon combustion processes to oxidize carbon monoxide and unburned hydrocarbons present therein, by contacting the exhaust gases with the catalyst at catalyst bed temperatures in excess of about 450°F. When the noble metal component of the catalyst is employed in the form of a coating on a high surface area support of honeycomb structure, these catalysts are particularly suitable for the treatment of automotive exhaust gases. Such configurations are very stable, exhibit desirable light-off behavior, and operate efficiently under conditions encountered in the automotive exhaust environment, e.g., temperatures in the range of about 350°–2,000°F., exhaust gas oxygen levels between 0.8–10%, exhaust gas pressures between 1 atmosphere and 10 psig, and space velocities in the range of about 100–200,000 $hrs.^{-1}$.

The invention may be further understood by reference to the following detailed examples showing the preparation and use of combination catalysts produced according to the invention.

EXAMPLE I

A cylindrical refractory support structure of the honeycomb type, having a length of 3 inches and a diameter of 4.66 inches (honeycomb support bulk volume about 51 cubic inches), is selected for treatment. This structure is composed predominantly of cordierite, and has approximately 210 cells (parallel longitudinal channels of square cross-section extending the length of the structure) per square inch of cross sectional area, defined by cell walls approximately 0.008 inch thick.

This honeycomb support is provided with a high-surface area support coating, consisting of a silica-alumina mixture containing about 20% $Al_2O_3$ and 80% $SiO_2$ by weight, according to conventional means. The coating has a thickness of about 0.003 inch and a surface area of about 20 m$^2$/gram as measured from nitrogen adsorption by the standard BET method.

A solution of cobalt, manganese, and titanium compounds is prepared by first slowly adding about 200 ml. of concentrated acetic acid to 173 grams of titanium tetraisopropoxide [$Ti(OC_3H_7)_4$] while continuously stirring. In a separate container, 134 grams of cobalt nitrate [$Co(NO_3)_2$] is added to a quantity of a commercial manganese nitrate solution containing 79 grams of $Mn(NO_3)_2$, and complete solution of all components is assured by further adding 300 ml. of methanol and 100 ml. of concentrated acetic acid and stirring for about 3 hours.

The titanium isopropoxide-acetic acid mixture previously prepared as described is then slowly added to the solution of cobalt and manganese nitrates while stirring, and stirring is continued for about 1 hour after the addition is completed. The proportions of titanium, cobalt, and manganese compounds present in this solution are such that they will yield a titanate catalyst component having a composition, on the oxide basis, of about 48% $TiO_2$, 15% $Mn_2O_3$, and 37% $Co_3O_4$ by weight.

The alumina-silica coated honeycomb support structure previously described is immersed in the above solution until thoroughly coated therewith. It is then removed, shaken to remove excess solution, and immersed in aqueous ammonium hydroxide (50% $NH_4OH$ by volume) for several minutes. Following removal from the $NH_4OH$ solution, a coating composed primarily of the hydrous oxides of titanium, cobalt, and manganese is found adhering to the support structure.

The honeycomb support with the hydrous oxide coating is then heated in air to a temperature of about 1,000°C., held at that temperature for about 2 hours, and finally cooled to room temperature. The final coating comprises a major titaniferous crystal phase of mixed ilmenite and spinel structure wherein a $Co_2TiO_4$–$Mn_2TiO_4$ solid solution of spinel structure and a $CoTiO_3$–$MnTiO_3$ solid solution of ilmenite structure are thought to predominate. This coating comprises about 10% by weight of the total weight of the support and coating.

Following the application of the cobalt-manganese titanate component as a coating on the honeycomb support, a noble metal component consisting essentially of platinum is incorporated into the catalyst in the form of a film or dispersion of platinum metal uniformly distributed on the surface of the cobalt-manganese titanate coating. The platinum component comprises about 0.5% by weight of the cobalt-manganese titanate-noble metal combination catalyst coating, or about 0.05% by weight of the catalyst-coated honeycomb support. A total of about 255 milligrams of platinum, or about 5 milligrams of platinum per cubic inch of honeycomb support bulk volume, is employed for this purpose.

The catalytic device prepared as described is quite active for the oxidation of unburned hydrocarbons and carbon monoxide present in hydrocarbon combustion exhaust gases, and is particularly well-suited for the treatment of automotive exhaust gases, as will hereinafter more fully appear.

EXAMPLE II

A catalytic device such as described in Example I is subjected to engine testing along with several other catalytic devices which have identical honeycomb configurations but which utilize different noble metal or base metal-noble metal combination catalysts. The sample devices are inserted into the exhaust stream of an eight-cylinder automotive engine and measured initially for conversion efficiency with respect to carbon monoxide and unburned hydrocarbons present in the engine exhaust. The samples are thereafter engine-aged for a specified number of hours according to a standard aging cycle involving both oxidizing and reducing exhaust conditions and catalyst bed temperatures ranging from about 350°–1,600°F., being periodically retested for carbon monoxide and hydrocarbon conversion efficiency in the course of engine aging.

The results of this testing are set forth in Table I below. The data includes information as to the catalyst system employed, the catalyst support coating utilized, if any, the amount of noble metal utilized in the catalyst system, the aging time in hours after which conversion efficiencies were determined, and the conversion efficiencies measured before and after aging for each of the systems studied. The conversion efficiencies given are percent overall hydrocarbon and carbon monoxide removal at an exhaust gas inlet temperature of 800°F. Noble metal loadings are given in milligrams per cubic inch of honeycomb support bulk volume, the noble metal components being present in all cases in the form of uniform surface dispersions on the catalyst surface.

TABLE I

| Sample No. | Catalyst System | | | Noble Metal Loading | Aging Time (hours) | Conversion Efficiency | |
|---|---|---|---|---|---|---|---|
| | Noble Metal | Base Metal | Support Coating | | | Hydrocarbons | CO |
| 1 | Platinum | None | $Al_2O_3$ | 5 mg/in$^3$ | 0 | 83.2 | 98.6 |
| | | | | | 50 | 75.4 | 96.2 |
| 2 | Platinum + Palladium (50%) | Cobalt Oxide | None | 5 mg/in$^3$ | 0 | 63.3 | 91.3 |
| | | | | | 24 | 62.3 | 77.8 |
| 3 | Platinum | Copper-Manganese Titanate | $Al_2O_3$ + $SiO_2$ (80%) | 5 mg/in$^3$ | 0 | 22.2 | 37.3 |
| | | | | | 50 | 25.4 | 37.1 |
| 4* | Platinum | Cobalt-Manganese Titanate | $Al_2O_3$ + $SiO_2$ (80%) | 5 mg/in$^3$ | 0 | 82.9 | 98.1 |
| | | | | | 50 | 80.5 | 97.3 |
| | | | | | 100 | 70.0 | 92.7 |

*Example I

From data such as shown above in Table I we have concluded that, at normal exhaust gas and catalyst bed operating temperatures, cobalt-manganese titanate-platinum catalysts (Sample 4) provide conversion efficiencies superior to other base metal-noble metal systems at equivalent noble metal loadings. In fact, conversion efficiencies are at least equivalent to alumina-supported platinum catalysts (Sample 1), which are known to be quite active and very stable.

In addition, testing of the light-off behavior of the devices compared in Example II indicates that the light-off characteristics of the cobalt-manganese titanate-platinum device are superior to those of the alumina-supported platinum device. Thus, the light-off time of the cobalt-manganese titanate-platinum device (Sample 4), defined as the time interval required to reach 20% conversion efficiency for hydrocarbons at a steady exhaust gas inlet temperature to the device of 650°F., is 0.9 minutes at 0 hours of engine aging, 0.78 minutes at 50 hours of engine aging, and 0.48 minutes at 100 hours engine aging. The alumina-supported platinum-bearing device on the other hand exhibits a light-off time of 1.23 minutes at 0 hours of engine aging and 2.55 minutes after 50 hours of engine aging. This advantage in light-off behavior results in substantial reductions in pollutant emissions at engine start-up, reductions which are significant because start-ups and low-speed driving have been identified as contributing a major proportion of urban air pollution caused by automobiles. For this reason, Federal standards weigh catalyst performance at engine start-up very heavily.

Cobalt-manganese titanate-platinum catalysts offer further advantages in carbon monoxide and hydrocarbon conversion efficiencies at intermediate operating temperatures as shown in the following example.

EXAMPLE III

Catalytic devices of the honeycomb type, in the form of small bench testing samples 2⅝ inches in length and 1 inch in diameter, are prepared for comparative testing. The samples consist of cordierite honeycomb supports provided with high surface area alumina catalyst support coatings upon which coatings of the catalysts to be compared are deposited. These catalysts include platinum alone and platinum in combination with base metal oxides which have been used for hydrocarbon and/or carbon monoxide oxidation in the prior art. The platinum component of the base metal-noble metal combination catalysts is present in all samples in the form of a dispersion of the metal on the catalytic surface.

These samples include a cobalt-manganese titanate-platinum catalytic device prepared substantially in accordance with the procedure described in Example I. The cobalt-manganese titanate component of the combination catalyst has an oxide composition, in weight percent as calculated from the proportions of starting materials, of about 48% $TiO_2$, 15% $Mn_2O_3$, and 37% $Co_3O_4$, and comprises a principal crystal phase wherein a $Co_2TiO_4$–$Mn_2TiO_4$–$Mn_3O_4$ solid solution of spinel structure and a $CoTiO_3$–$MnTiO_3$ solid solution of ilmenite structure predominate.

Prior to comparative testing, all of the samples are subjected to accelerated thermal aging by 24-hour firing at 800°C. in air.

Comparative testing of the samples involves passing a simulated exhaust gas mixture containing 0.9% CO, 0.0225% propylene, 1.125% oxygen, 10% water vapor and the remainder nitrogen (by volume) through each sample at a space velocity of 15,000 hr.$^{-1}$, while recording oxidation efficiency for the removal of carbon monoxide and propylene as a function of sample temperature. The sample temperatures at which 50% propylene removal and 50% carbon monoxide removal occur are compared among the samples to determine the relative intermediate temperature conversion efficiencies thereof.

Table II below sets forth the results of testing in accordance with the above-described method, including the sample number, the catalyst composition, the noble metal loading for each catalyst in milligrams per cubic inch of honeycomb support bulk volume, and typical 50% conversion temperatures for propylene and carbon monoxide for each sample.

TABLE II

| | Catalyst Composition | | Aged Catalytic Activity 50% Conversion Temperatures (°F.) | |
|---|---|---|---|---|
| Sample No. | Noble Metal/Base Metal | Noble Metal Loading | Propylene | Carbon Monoxide |
| 5 | Platinum/none | .22 mg/in$^3$ | 570 | 570 |
| 6 | Platinum/$Cr_2O_3$ | .22 mg/in$^3$ | 690 | 690 |
| 7 | Platinum/CuO | .22 mg/in$^3$ | 675 | 530 |
| 8 | Platinum/Copper Chromite ($CuCr_2O_4$) | .22 mg/in$^3$ | 680 | 600 |
| 9 | Platinum/Cobalt-Manganese Titanate | 5 mg/in$^3$ | 600 | 580 |

From data of the kind shown above in Table II we have concluded that cobalt-manganese titanate-platinum catalysts offer substantial advantages in activity and stability over other base metal-noble metal combination catalysts even when substantially decreased quantities of platinum are employed therein. It thus appears that our combination catalysts are capable of providing a substantial cost advantage over pure noble metal systems such as platinum-alumina (Sample 5 of Table II), since nearly equivalent levels of activity may be obtained at considerably reduced noble metal loadings in our systems.

We claim:

1. A catalyst for the oxidation of carbon monoxide and unburned hydrocarbons present in the exhaust stream of a hydrocarbon combustion process which consists essentially of a noble metal component comprising about 0.00125–25% by weight of said catalyst and a cobalt-manganese titanate component comprising the remainder of said catalyst, said cobalt-manganese titanate component having an oxide composition, in weight percent, of about 30–50% $TiO_2$, 5–25% $MnO_x$, and 35–50% $CoO_x$, wherein $x$ ranges from 1–1.5, and comprising a major crystal phase consisting of at least one crystalline species selected from the group consisting of titaniferous solid solutions of spinel structure ($M_2TiO_4$–$M_3O_4$) and titaniferous solid solutions of ilmenite structure ($MTiO_3$–$M_2O_3$), M being selected from the group consisting of manganese and cobalt.

2. A catalyst according to claim 1 wherein the noble metal component consists of at least one metal selected from the group consisting of platinum, palladium, rhodium, ruthenium, and iridium.

3. A catalyst according to claim 2 wherein the noble metal component comprises 0.5–5% by weight of the catalyst, and wherein the noble metal component is present in the form of a uniform dispersion of noble metal on the external surface of said catalyst.

4. A catalyst according to claim 3 wherein the noble metal component is platinum.

5. A catalyst according to claim 4 wherein the cobalt-manganese titanate component has an oxide composition, in weight percent, of about 45–50% $TiO_2$, 10–20% $MnO_x$, and 35–40% $CoO_x$, wherein $x$ ranges from 1–1.5.

6. An oxidative catalytic device comprising:
   a. a refractory support structure of the honeycomb type; and
   b. a cobalt-manganese titanate-noble metal catalyst coating disposed on at least a portion of said support structure comprising about 2–40% by weight of the device, said catalyst coating consisting essentially of a noble metal component comprising about 0.00125–25% by weight of said catalyst and a cobalt-manganese titanate component comprising the remainder of said catalyst, said cobalt-manganese titanate component having an oxide composition, in weight percent, of about 30–50% $TiO_2$, 5–25% $MnO_x$, and 35–50% $CoO_x$, wherein $x$ ranges from 1–1.5, and comprising a major crystal phase consisting of at least one crystalline species selected from the group consisting of titaniferous solid solutions of spinel structure ($M_2TiO_4$–$M_3O_4$) and titaniferous solid solutions of ilmenite structure $MTiO_3$–$M_2O_3$), M being selected from the group consisting of manganese and cobalt.

7. An oxidative catalytic device according to claim 6 which further includes a high surface area catalyst support coating disposed on at least a portion of the refractory support structure, said coating being disposed between said support structure and said cobalt-manganese titanate-noble metal catalyst.

8. An oxidative catalytic device according to claim 6 wherein the high surface area catalyst support coating consists essentially of oxides selected from the group consisting of silica, alumina, and mixtures thereof.

9. An oxidative catalytic device according to claim 8 wherein the noble metal component of the cobalt-manganese titanate-noble metal catalyst:
   a. comprises about 0.5–5% by weight of said catalyst;
   b. is composed of at least one metal selected from the group consisting of platinum, palladium, rhodium, and ruthenium; and
   c. is present in the form of a uniform dispersion of noble metal on the external surface of said catalyst.

10. An oxidative device according to claim 9 wherein the noble metal component of the cobalt-manganese titanate-noble metal catalyst is platinum.

11. A process for treating exhaust gases from a hydrocarbon combustion process to oxidize carbon monoxide and unburned hydrocarbon present therein to carbon dioxide and water which comprises contacting said exhaust gases at an exhaust gas temperature in excess of about 450°F. with a cobalt-manganese titanate-noble metal catalyst consisting essentially of a noble metal component comprising about 0.00125–25% by weight of said catalyst and a cobalt-manganese titanate component comprising the remainder of said catalyst, said cobalt-manganese titanate component having an oxide composition, in weight percent, of about 30–50% $TiO_2$, 5–25% $MnO_x$, and 35–50% $CoO_x$, wherein $x$ ranges from 1–1.5, comprising a major crystal phase consisting of at least one crystalline species selected from the group consisting of titaniferous solid solutions of spinel structure ($M_2TiO_4$–$M_3O_4$) and titaniferous solid solutions of ilmenite structure ($MTiO_3$–$M_2O_3$), M being selected from the group consisting of manganese and cobalt.

12. A process according to claim 11 wherein the catalyst is disposed on a refractory support structure of the honeycomb type.

* * * * *